United States Patent [19]

Garrick et al.

[11] 4,040,655
[45] Aug. 9, 1977

[54] PNEUMATIC SYSTEMS AND VALVES THEREFOR

[76] Inventors: Laurence James Garrick; Rachel Simon, both of 27 Ohayo Mountain Road, Woodstock, N.Y. 12498

[21] Appl. No.: 625,925

[22] Filed: Oct. 28, 1975

Related U.S. Application Data

[63] Continuation of Ser. No. 351,762, April 16, 1973, abandoned.

[30] Foreign Application Priority Data

Apr. 17, 1972  United Kingdom ............... 17673/72

[51] Int. Cl.² .............................................. B60N 1/02
[52] U.S. Cl. ................................ 296/63; 297/DIG. 3
[58] Field of Search ............. 296/63, 10; 297/DIG. 3, 297/14, 15, 455, 385; 5/365, 370; 280/732, 736, 742, 744; 137/625.21, 625.22, 625.23, 625.24

[56] References Cited

U.S. PATENT DOCUMENTS

| 3,115,160 | 12/1963 | Rogers | 137/625.24 X |
|---|---|---|---|
| 3,166,799 | 1/1965 | Birnkrant | 297/14 X |
| 3,393,937 | 7/1968 | Wehmer | 5/370 |
| 3,648,306 | 3/1972 | Averbach | 297/385 X |

FOREIGN PATENT DOCUMENTS

| 653,422 | 3/1965 | Belgium | 296/10 |

Primary Examiner—Joseph F. Peters, Jr.
Assistant Examiner—Michael J. Forman
Attorney, Agent, or Firm—Barry G. Magidoff

[57] ABSTRACT

This invention provides a stabilized firmly anchored inflatable article comprising a flexible member and a rigid member attached thereto. The flexible member is so designed that portions of its surface press against a rigid surface surrounding the rigid member when the flexible member is inflated. This invention also provides a pneumatic system connected with the inflatable article for providing fluid under pressure to the inflatable article and a motor vehicle including the pneumatic system.

The pneumatic system comprises the inflatable article, a fluid pump, drive means for the fluid pump and a regulating valve for controlling the flow of fluid between the inflatable article and the pump.

This invention further provides a multi-port valve for use as the regulating valve. The valve permits the fluid pump to continuously operate in a single flow direction by providing means to place the pump, sequentially, first, in an inflating condition in relation to the inflatable article, second, in a deflating condition in relation to the inflatable article and in an intermediate idle, or neutral, condition wherein the pump is closed off from the inflatable article.

10 Claims, 7 Drawing Figures ns and stanchions, see U.S. Pat. Nos.
PNEUMATIC SYSTEMS AND VALVES THEREFOR This is a continuation of application Ser. No. 351,762, filed Apr. 16, 1973 and now abandoned.

Inflatable or pneumatic devices formed from walls of relatively thin, flexible material which can be readily folded into a highly portable, compact shape in the deflated condition, but which, with great ease, can be set up by inflating the device to the desired full size, have greatly interested workers in the various arts. Taking advantage of the inherent portability and compactness, as well as the resilience of the inflated pneumatic article, workers have designed and manufactured devices as diverse as inflatable toys, see U.S. Pat. Nos. 2,748,256; 2,698,498; and British Pat. No. 334,352; inflatable traffic markers and stanchions, see U.S. Pat. Nos. 2,800,097; 2,762,327 and 2,808,803. The problem which has plagued many users of the pneumatic or inflatable devices has been the inherent instability and light weight which makes it difficult to maintain them in a stationary upright position, especially when they may be exposed to the effects of wind in outdoor locations. Thus, these devices have been modified to include rigid and weighted support bases for their devices, for example, in toys, as in U.S. Pat. No. 2,698,496 or in traffic markers and stanchions as in U.S. Pat. Nos. 2,863,416, 2,762,327 and 2,808,803.

Portable furniture has been made from pneumatic, or inflatable, devices. Examples of inflatable seating furniture, wherein the entire seat is formed by inflatting a flexible member, are shown in U.S. Pat. Nos. 3,712,674, and 2,437,602. Further, an inflatable table especially designed for use in motor vehicles, such as automobiles or airplanes, is shown in U.S. Pat. No. 3,650,223. The stability of the inflatable chair described in U.S. Pat. No. 3,712,674 is improved by utilizing a bottom portion, or base, which can adhere by suction to the floor.

Pneumatic chairs have also been suggested for use in motor vehicles, such as automobiles. Wierwille, in U.S. Pat. No. 3,363,941, describes an automobile seat and back rest divided into independently inflatable sections, such that the relative contour and firmness of the seat and/or back rest can be modified to individual tastes. Each of the independent sections is described as being independently connectable to, for example, a compressor or air tank, or to an external fluid source, via a separate valve, and each section is also provided a release valve for deflating each individual section to the desired softness. The several sections are supported on a rigid frame, defining the seat. U.S. Pat. No. 3,128,125 describes a car seat cushion of a resilient material, such as foam rubber, having inflatable members therein which can be inflated to vary the contour and/or firmness of the seat or back.

The inflatable or pneumatic automobile seats of U.S. Pat. No. 3,128,125 and of U.S. Pat. No. 3,363,941 provide for the simple deflation of the pneumatic chamber and inflation thereof by a separate fluid pressure source. U.S. Pat. No. 3,363,941 described two separate valves attached to each inflatable section, one valve being connected to a fluid source for inflating the section, the other valve exhausting to the atmosphere to permit deflation or pressure reduction of the section.

A great variety of multi-port valves are available and have been used for a variety of purposes. See for example, the steam piston engine control valve described by Pilliod in U.S. Pat. No. 1,382,119.

The present invention provides a pneumatic or inflatable device, such as an article of furniture, e.g. a chair, a bench, or sofa, preferably with arms and back rest, or a structural member, e.g. a room divider, or wall, or cushion, having improved stability and being sufficiently stable and firmly enough anchored to be usable as, for example, a seat in a motor vehicle. In a preferred embodiment, the inflatable device is utilized in a vehicle, including a land, marine or aerospace vehicle. Also, preferably, the invention provides means for supporting and storing the device whereby, when the device is in the inflated condition, means are provided for increasing the stability and anchoring the inflatable device and in the deflated condition the same means provide protective storage for the flexible wall of the inflatable device. Means are also provided for inflating and for positively withdrawing fluid from within the inflatable device.

In accordance with the present invention, a stabilized, firmly anchored, inflatable article, especially useful as a seating structure, is provided, comprising a flexible substantially fluid-impermeable member, the flexible member being shaped to define a fluid space; marginal portion on the flexible member defining an opening therethrough; a rigid retaining member in fluid-tight connection with the marginal portions, the rigid retaining member and the flexible member defining a fluid-tight space; and fluid conduit means connected to the inflatable article for passing fluid under pressure into and withdrawing fluid from the fluid-tight space; the rigid retaining member being designed and adapted to be rigidly connected to a substantially rigid surface whereby in the inflated condition, the flexible member extends outwardly and laterally from the rigid retaining member and portions of the flexible member press against the rigid surface, thereby stabilizing the inflated article with respect to the rigid surface.

Generally, the flexible member is shaped, and sized, to define the shape, and almost the entire surface, of the desired inflatable article, with the exception of a minor portion which is defined by the marginal portions of the flexible member and enclosed by the rigid retaining means. Fluid under pressure causes the inflation of the flexible member to the desired shape. When inflated, the flexible member surrounds the rigid retaining member, pressing against the rigid surface to which the rigid retaining member is attached, along an area surrounding the rigid member. The force with which the flexible member, in the inflated condition, presses against the surrounding area of the rigid surface, determines the stability of the inflated article in relation to the rigid surface, and the force is a function of the fluid pressure to which the article is inflated. Depending upon the nature of the article, the area of the rigid surface against which the inflated flexible member presses, need not be equal in all directions around the rigid retaining member.

The rigid surface is preferably a substantially, flat plane. However, the rigid member can be attached to a curved surface, such as in an aerospace vehicle or in a boat, and the stabilizing effect of the inflated flexible member is obtained by pressing against the curved, but rigid, surface.

The rigid surface can be horizontal or vertical, and, if horizontal, the inflated article can extend upwardly (i.e.

as from a floor) or downwardly (i.e. as from a ceiling) from the rigid surface and retaining member.

Although the rigid retaining member can be a flat plate, preferably the rigid retaining member is recessed, defining a concavity, which is open to the fluid space defined by the flexible member. In a most preferred embodiment, the rigid member has sufficient volume, i.e. cross sectional area and depth, to fully contain the flexible member, when that member is in a deflated and collapsed condition. The rigid retaining member is preferably recessed into the rigid surface.

In a preferred seating system, the flexible member also defines, in addition to a seating surface, a back and arm rests, as in an arm chair or sofa. The fluid space defined by the back and arm rests, are also preferably in fluid connection with the space defined by the seat and the rigid retaining member. The flexible member can define practically any shape or size of, e.g. seating system.

The space defined by the flexible member and the rigid means, should be connectable to a source of fluid pressure. Preferably, the connection is through a sealable conduit opening through the rigid support means. In a most preferred embodiment, the fluid pressure source is capable of providing not only fluid under pressure, but is also capable of drawing a vacuum so as to positively exhaust the fluid from within the inflated article. This is especially useful in combination with the recessed rigid retaining member so that the flexible material is automatically drawn in towards and within the confines of the recessed rigid retaining member. This is especially significant when the recessed member is of sufficient volumetric capacity to contain the entire flexible material in its deflated condition, including, for example, the seat, back and sides or arm rests of an arm chair or sofa. In the preferred and simplest embodiment, these back and side portions are in fluid flow connection with the seat portion such that when air is withdrawn from the seat portion, the fluid within the back and side portions is also withdrawn.

The preferred, recessed rigid support member can be defined as a fluid-tight box, open at one side, to which is connected the flexible member. The box can have any shape, but preferably, the box has sufficient depth in which to contain and store the entire flexible member, thus protecting the flexible member from damage when not inflated and in use.

The connection between the marginal portions of the inflatable flexible member and the rigid retaining member, can be of any conventional type suitable to form a fluid-tight seal therebetween. The connection can be by an adhesive bond, by the use of clamping members, or by the use of a self-sealing method, such as heat-sealing, between the flexible member and the rigid member. The rigid member and flexible member can both be formed, for example, of the same synthetic solid polymer, but having different thicknesses. Preferably, the rigid member is formed of a metal, such as iron, or steel, or aluminum, and the flexible member is formed from a plastic or rubber based material. In one possible embodiment, the rigid member can be formed of a synthetic polymer resin of a relatively greater thickness, and without plasticizer, such that it is substantially rigid, and the flexible portion can be formed of the same polymer, but of a far thinner gauge, i.e. film, and preferably, if required, containing a plasticizer. In this embodiment, the flexible and rigid portions can be formed almost as a single unit with an interface of gradually decreasing thickness or with a sharp discontinuity of thickness formed by e.g., heat-sealing the two sections together. Preferably, the flexible material is not an elastomer, or a material having a similar degree of elasticity. Rubberized, or otherwise impregnated and/or coated, impermeable, woven fabric, or even corded rubber, such as pneumatic tire material, would be useful if sufficiently flexible.

Padded, or expanded material, such as foam rubber, can be applied to the seat and back portions of a chair, if desired.

An extremely useful context for the inflatable system in accordance with the present invention, is in vehicles, whether of land, marine or aerospace type. In such vehicles, space is at a premium and a device which can be stored away so as to leave an unobstructed floor area when not needed, but which can be readily placed into useful portions when needed, would be of great value. In such a context, the rigid support member would be placed within the floor or wall surface of the vehicle, extending downwardly or outwardly, away from the interior surface of the vehicle, so that when the inflatable member is deflated and withdrawn into the support member, a substantially flat unobstructed surface remains within the vehicle. A powered vehicle is an especially useful context for the inflatable article of the present invention because the power plant, i.e. engine or motor, for the vehicle can be readily tapped to power a mechanical source of fluid pressure, i.e., a pump.

The pneumatic system, in accordance with the present invention, in the contact of the motor vehicle, comprises the inflatable article, wherein the rigid retaining member is anchored to a rigid surface of the vehicle, such as a wall, floor or ceiling. The fluid feed conduit means is in fluid flow connection with regulating valve means which in turn is in fluid flow connection with fluid pressure supply means.

Preferably, the fluid pressure supply means can be both a source of increased fluid under advanced pressure to inflate the inflatable article and a means for decreasing fluid pressure, i.e. vacuum withdrawl, or deflating means. The fluid pressure supply means is preferably a pump which also comprises driving means operably connecting the fluid pressure supply means to the power plant for the vehicle, for driving the fluid pressure supply means. Preferably, further, the valve means also comprises means for sequentially connecting the fluid feed conduit to a source of positive pressure and to a source of negative pressure, and also for sealing off the fluid supply means from the inflatable article.

For ease of operation, the fluid pressure source or pump is constantly driven by the vehicle power source and there is not provision made for reversing or discontinuing the operation of the pump as long as the power plant generates power. preferably, it is the regulating valve means which is capable of reversing the flow of fluid between the pump and the inflatable article by sequentially connecting the feed conduit in the inflatable member first to the high pressure, exhaust end of the pump, second to the low pressure, inlet end of the pump, and finally, sealing off the pump from the inflatable article, putting the pump in a neutral, or idle, condition where both the inlet and the outlet to the pump are connected to the atmosphere. This single, reversible, multi-port valve avoids the problems of complex piping arrangements or the more complex, mechanical disconnecting apparatus to reverse the pump per se.

A reversible, regulating valve means which is useful in the preferred pneumatic system for use in vehicles in accordance with the present invention, comprises a valve housing; a housing inlet conduit designed and adapted to be connected to the low pressure inlet conduit to a pump; a housing outlet conduit designed and adapted to be connected to the high pressure outlet conduit from a pump; valve housing dividing means movably connected within the housing so as to divide the housing into two mutually sealed chambers, a housing inlet chamber and a housing outlet chamber; atmosphere inlet conduit connecting the housing inlet chamber to the atmosphere when open; atmosphere outlet conduit connecting the housing outlet chamber to the atmosphere when open; a fluid feed conduit in fluid connection with the inflatable device; a first valve element, a second valve element and a third valve element, all operatively connected to the housing dividing means and so juxtaposed within the housing that in a first position of the housing dividing means, and the valve elements, the fluid feed conduit is sealed and the other conduits are all open, thereby putting the pump and valve means in the neutral, or idle, condition; in a second position of the housing dividing means, the fluid feed conduit is open to the housing outlet chamber, the atmosphere outlet conduit is closed and the atmosphere inlet conduit is open, thereby putting the pump and valve means into the inflating condition; and in a third position of the house dividing means, the fluid feed conduit is open to the housing inlet chamber, the atmosphere inlet conduit is closed and the atmosphere outlet conduit is open, thereby putting the pump and valve means into the deflating condition.

In operation, the pump is idling when the valve is in the neutral position, that is air enters from the atmosphere inlet conduit, passes through the pump inlet conduit, through the pump, out the pump outlet conduit and out the atmosphere outlet conduit; thus the pump is operating against zero pressure. The energy drain on the vehicle power source by the continued operation of the pump means in the neutral position is substantially zero, requiring merely the energy to overcome the inertia and any small friction forces present in the moving pump parts. In the inflating condition, air or other fluid enters the atmosphere inlet conduit, passes into the pump inlet conduit through the pump, out the pump outlet conduit under pressure, and into the feed conduit to inflate the inflatable article. In the exhaust or deflating position of the valve, the atmosphere inlet is closed off and air is sucked out the inflatable member, passing through the inlet housing section and into the pump inlet conduit, through the pump, out the pump outlet conduit into the outlet housing section and out the atmosphere outlet conduit, thus fluid is positively withdrawn from the inflatable member. If, for any reason, a fluid other than air is required, or desirable, for use in the inflation of the inflatable means, the atmosphere inlet conduit and atmosphere outlet conduit respectively, can be connected to a reservoir of the desired fluid.

The inflatable article, in accordance with the present invention, is preferably an article of furniture, especially a seating system such as a chair, sofa, bench, or hassock.

In addition to seating systems, other useful inflatable articles, especially useful in the context of a vehicle, are space dividers and impact cushion means for use in the cargo areas of such vehicles. Such a cushioning or space dividing means can include a flexible, inflatable portion connected to a rigid retaining member connected to horizontal floor surface, or to a vertical wall surface, or to a horizontal ceiling surface, it is only necessary that the surface of the flexible member immediately surrounding the marginal portions press against the rigid surface. When the inflatable article is, e.g., a seating system, it is also preferred that the bottom surface of the furniture extend to contact the floor, so as to aid in supporting the weight of persons seated thereupon, if attached to a wall.

The invention is more specifically described with reference to the embodiments shown in the accompanying drawings, which it is believed illuminates the advantages and uses of the present invention. It should be understood that the embodiments shown in the accompanying drawings, are given by way solely of illustration and example and not of limitation. Many changes can be made in the details and aspect of the embodiments shown, without departing from the full scope of the present invention.

Referring to the drawings.

Figure 1:
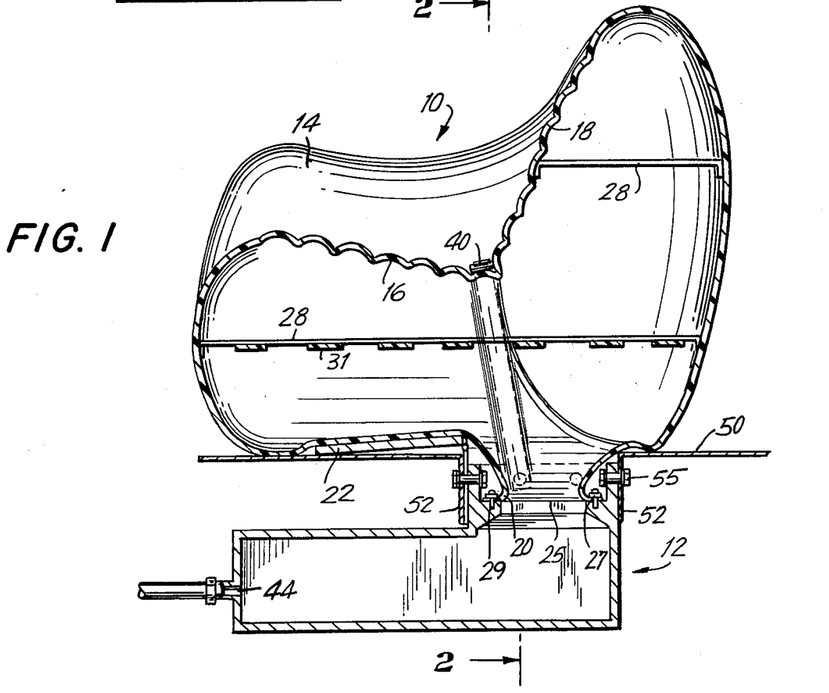
FIG. 1 is a side elevation view of an inflatable chair in accordance with the present invention.
Figure 2:
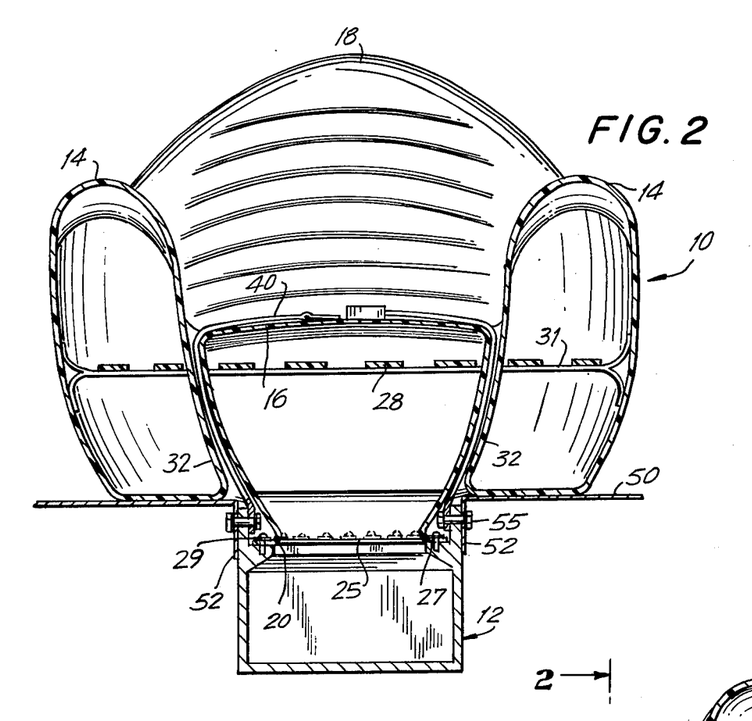
FIG. 2 is a front elevation view of an inflatable chair in accordance with the present invention.

Referring to FIGS. 1 and 2, an inflatable arm chair system is shown, including an upper flexible seating member formed of a flexible fluid-impermeable, sheet material, indicated generally by the numeral 10, and a lower, recessed rigid retaining member indicated generally by the numeral 12. As shown, the recessed rigid retaining member has an L-shaped cross section and is of sufficient volumetric capacity to contain the flexible member 10, when completely deflated. The upper flexible member 10 defines a single interconnected fluid chamber, including arm portions 14, seat portion 16 and back portion 18. The flexible member 10 also includes marginal portions 20, defining an opening into the bottom of the flexible member 10; the marginal portions 20 are connected in a fluid-tight manner to a ledge 25, extending along the perimeter of the retaining member 12. In this embodiment, the sealed connection is made by clamping the flexible material forming the marginal portions 20 between the ledge 25 and a plate 27, the ledge and plate being clamped firmly together by threaded bolt members 29. A single fluid-tight inflatable chamber is then formed, defined by the interior surfaces of the upper flexible member 10 and the interior surfaces of the rigid member 12.

The flexible sheet material forming the flexible member 10 can be formed, e.g., by cutting and sewing a sheet to form the desired shape shown for the chair, in a manner known to the art. Preferably, the entire interior of the flexible member 10 is in fluid flow connection such that a single exhaust valve can be utilized for exhausting all of the air from within the inflatable member 10. However, it is common practice, in order to maintain the shape of the chair, especially when the force is exerted as by persons sitting upon the seat portion 16, to include interior, structural, retaining webs 28, 31 and 32, formed of flexible material, such as strong fabric, i.e. canvas, which is flexible but substantially non-elastic in tension, so as to reduce the loss of shape by, e.g. bulging at the side walls of the arm rest 14. The webs 32, each textend from the rear corners of the seat portion 16, to the ledge 25 of the rigid retaining member 12, and form tunnels through the inflatable chamber, the spaces within the tunnels are sealed off from the interior fluid space and are open to the exterior. As shown in this embodiment of a chair, which is intended for use in vehicles, seat belts 40, also connected to the rigid retaining means 12, extend upwardly through the tunnels 32, for use for restraining persons sitting on the seat portion 16. Thus, the tunnels not only provide access for the seat belts to the rigid retaining member, providing for the safety of the occupant of the chair in a moving vehicle, but also serve to stabilize and shape the inflated chair. In other contexts where seat belts are unnecessary, the tunnels can of course be closed and a single sheet of the flexible non-elastic material, e.g. canvas, substituted therefore, in the same locations.

As shown in FIGS. 1 and 2, the recessed rigid retaining member 12, comprises a box-like member having walls 42 formed of a rigid material, especially of a metal such as steel, and from the side has an L-shaped cross section. At the far end of the L, a port 44 is provided, designed and adapted to be connected to a source of fluid under pressure. As shown in FIGS. 1 and 2, the rigid retaining member box 12, is anchored beneath a rigid floor surface 50, in this case, formed of a metal such as steel. The floor surface 50 is bent downwardly to form flanges 52, to which are secured the retaining member 12, by bolt means 55. As shown, the connection between the flexible member and the rigid retaining member is slightly beneath the level of the floor surface 50 and the flexible material 10 extends upwardly, and outwardly and laterally, when in the inflated condition, such that the surface of the flexible member 10 surrounding the marginal portions 20, press against the portion of surface 50 surrounding the opening to the recessed retaining member 12.

Figure 3:
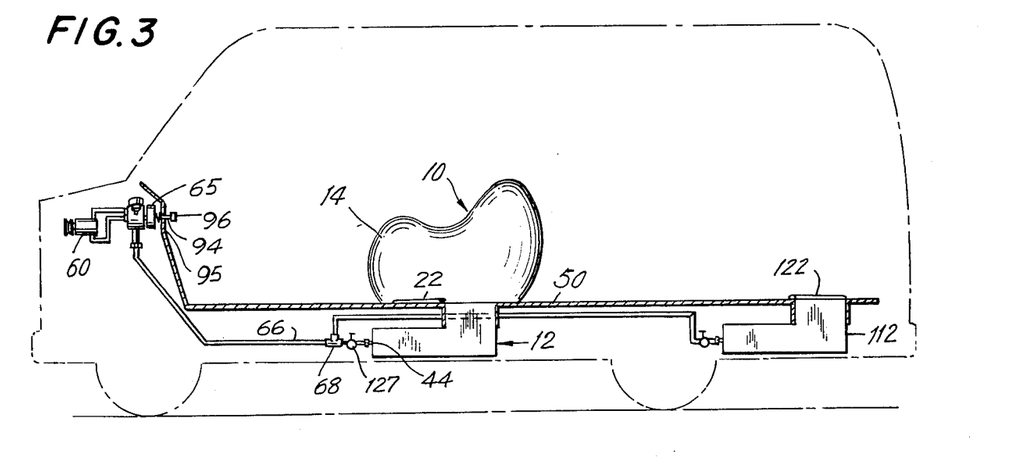
FIG. 3 is a side elevation view, showing, schematically, a motor vehicle, including an inflatable system of the present invention.

In the preferred embodiment of this invention, the inflatable article is placed in the context of a motor vehicle, shown schematically in FIG. 3. The floor surface 50 is the floor of, for example, a four-wheeled motor van. In this embodiment, when the flexible member 10 is withdrawn into the recessed rigid member 12, the floor surface of the van is unencumbered and presents a flat open surface available for the carrying of cargo or other goods. As shown, the recessed member 12, includes a hinged lid 22, which, when the flexible material 10 is deflated, covers the recessed member 12, but when the article is inflated, the cover 22 is open and lies substantially flat along floor 50, as shown in FIG. 1.

As shown in FIG. 3, a small four-wheeled van can provide conventional seating capacity for the driver and one or two front passengers. Behind this conventional seating, the floor of the van is modified in the manner which provides one or more inflatable seats behind the front seat. In this case, a first set of inflatable chairs 10 are provided immediately behind the driver's seat, shown open; and a second pair of inflatable seats towards the rear of the van, shown in the deflated, stored condition within a recessed rigid member 112. In the closed position, as can be seen, the rear floor of the van is unobstructed and presents a completely flat surface to any desired cargo.

Air, under pressure, to inflat the inflatable chair is delivered by an air pump 60 located adjacent the engine in the front portion of the van, and driven, for example, from the engine crank shaft. Any conventional means of driving the pump 60, whether directly off the crank shaft, by a fan belt or even by tapping the exhaust gases to operate a turbo-compressor, would be useful in this invention. The manner of driving the pump and the design of the pump is not a part of this invention and any conventional means for mechanically providing fluid under pressure, can be utilized. Rotary air pumps, reciprocal, or piston, pumps, or even centrifugal compressor pumps, can be utilized in this invention. However, preferably, positive displacement air pumps would be most useful to deliver the pressures required to inflate the inflatable chair to its desired pressure. If desired, fluid can be supplied from a pressure reservoir, a bottle of compressed gas or from an external source.

Figure 4:
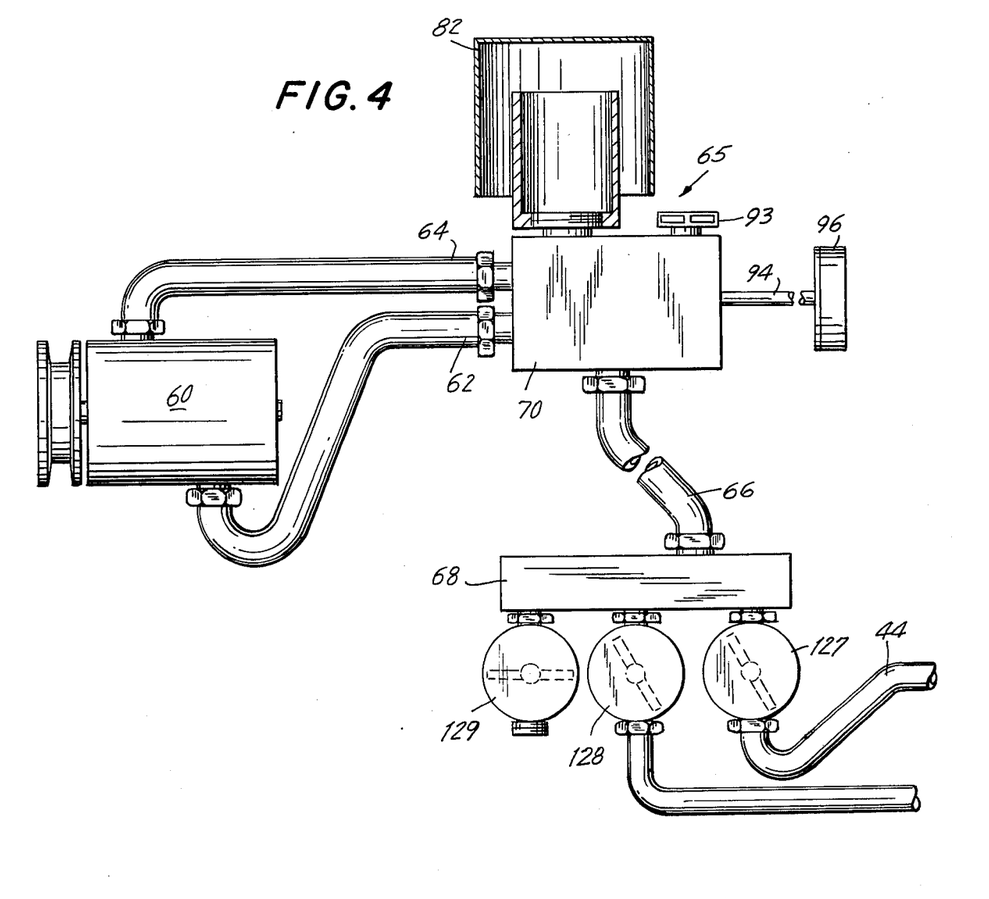
FIG. 4 is a schematic diagram showing details of a pneumatic system useful on a vehicle in accordance with the present invention.

As shown, the air is pumped from the air pump 60 through a regulator valve 65, and through conduits 66 to the inlet port 44 into the recessed rigid member 12. Where, as in this case, a plurality of inflatable chairs are provided, each chair is preferably independently connected to a manifold 68, shown also in schematic diagram in FIG. 4; a shut off valve 127, 128 and 129 is connected between the interior space of flexible member 10 and rigid member 12 and the manifold 68 permitting independent control over each inflatable article.

The preferred embodiment of the regulator valve 65, shown in FIG. 3, is shown in detail in FIGS. 4, 5, 6 and 7. This regulator valve embodiment comprises the valve housing 70, rotatable housing dividing member 72, dividing the housing 70 into two mutually sealed chambers: the first, or inlet, chamber 90 including the inlet port 62 connected to the inlet to the pump 60 and the second, or outlet, chamber 92 including outlet port 64 connected to the outlet from the pump 60. The dividing means 72 is rotatable over a limited angle between stops 74 and 76 protruding from the inner wall of housing 70. In this embodiment, where air is drawn into the housing 70, from the atmosphere, air is first passed through an air filter 82 to prevent the entrance of abrasive materials which could cause the wearing out or clogging of the pump and valve devices.

Dividing member 72 is rigidly connected to double valve element 84 and valve element 86, at each end respectively; each of the valve elements slidably and sealably contact the inner wall of housing 70 to form the seal between the two housing chambers. The inlet housing chamber 90 is continuously connected to the inlet end of pump 60 through port 62 and the outlet chamber 92 is continuously connected to the outlet end of pump 60 through port 64.

The inlet chamber 90 is also connectable to the atmosphere via inlet port 91, and filter element 82. The outlet chamber 92 is also connectable to the atmosphere via outlet port 93. The interior of the housing is also connectable to the inflatable article via main fluid port 63.

The valve housing dividing member 72 is carried on a spindle 94 which passes, as shown in FIG. 3, through the engine compartment bulkhead 95 and terminates in a manually controllable knob 96 on the dashboard of the motor vehicle. The movement of the housing dividing means 72 and of valve elements 84 and 86 are thereby manually controllable by the driver or passengers.

Figures 5, 7:
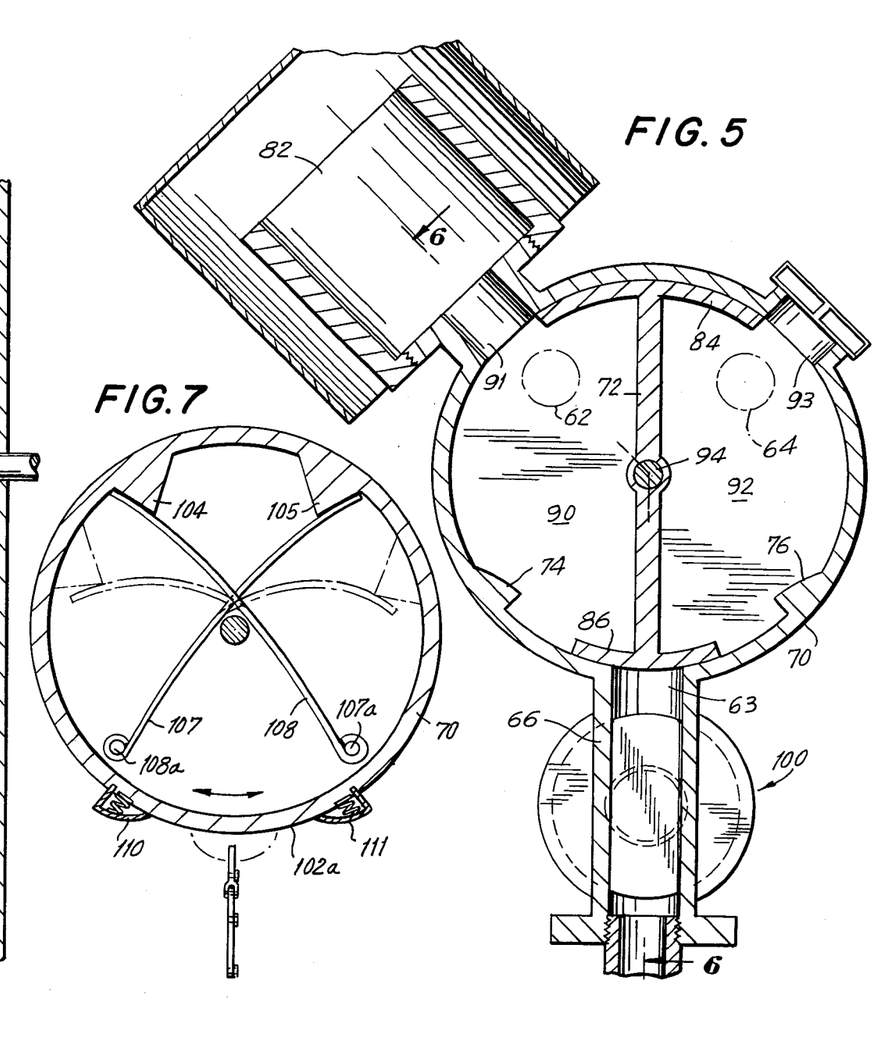
FIG. 5 is a front elevation view of a regulating valve useful in the pneumatic system in accordance with the present invention.
FIG. 7 is a rear elevation view of the regulating valve, showing the automatic cut-off means.
Figure 6:
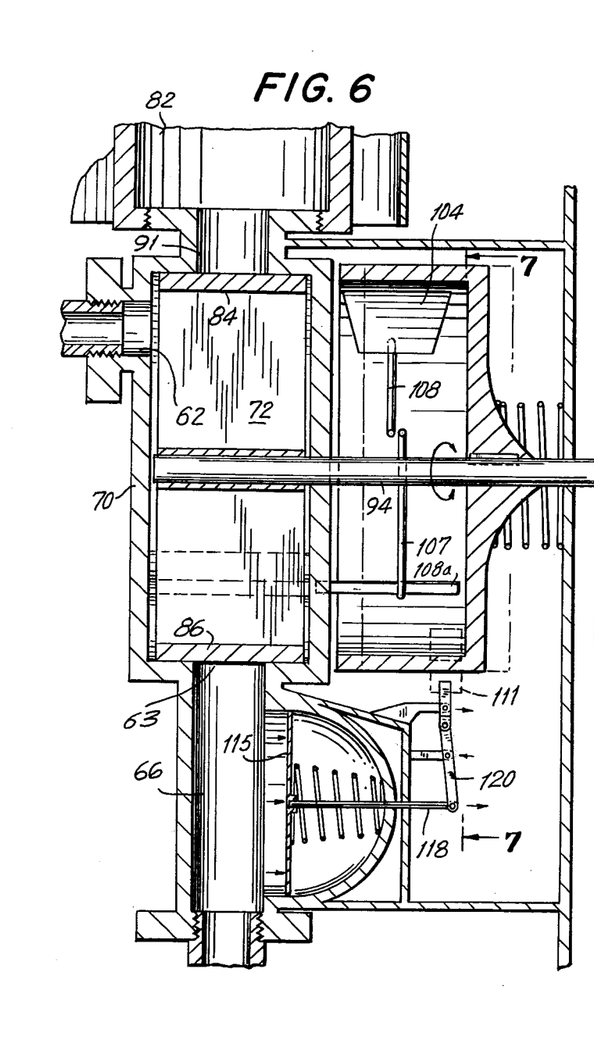
FIG. 6 is a side elevation view of the regulating valve.

In the preferred embodiment of the regulating valve 65, shown in FIGS. 5, 6 and 7, the regulating valve is provided with an automatic cut-off mechanism, generally indicated in FIG. 5 by the numeral 100, which acts to automatically return the housing dividing means 72 to its neutral position, i.e. that shown in FIG. 5, closing off the main fluid port 63 and thus preventing movement of air to or from the inflatable article. The automatic cut-off mechanism comprises a drum 102 splined onto the valve spindle 94 so as to be capable of sliding movement with respect to the spindle 94 but rotatable with the spindle. The drum 102 carries two internally projecting lugs 104 and 105 on its inner surface, which engage release springs 108 and 107, respectively, each spring is anchored to the valve housing 70, via pins 108a and 107a respectively, and act to bias the spindle, and thus the dividing means 72, into the position of rotation corresponding to the neutral position, shown in FIG. 5. The drum 102 also carries two externally projecting ears 110 and 111, each flexibly connected at one end to the outer surface 102a of drum 102 and biased away from the outer surface 102a at the second end. The automatic cut-off means also includes a diaphragm 115 sealably secured to and forming a portion of the wall of the conduit 66 leading from main fluid port 63. The diaphragm is biased towards the center of the conduit 66 by helical spring member 116. The diaphragm 115 is anchored to one end of push-rod 118, the second end of which is pivotally connected to a lever arm 120, which is in turn, also pivotally anchored to valve housing in such a manner as to permit movement in a direction within the plane including the axes of the push-rod 118 and of the lever arm 120, but prohibiting movement in a direction perpendicular thereto. The upper end of lever arm 120 intersects the line of movement of projecting ears 110 and 111 when the drum 102 is rotated, retaining the drum 102, and thus the dividing member 72 at the extreme limits of its rotational movement, determined by lugs 74 and 76.

Fluid feed conduit 66 from the regulator valve 65 connects to a manifold 68 which in turn is connected to a plurality of shut-off valves 127, 128 and 129. Each shut-off valve is connected through a supply conduit to one of the inflatable articles secured to the vehicle via a conduit, e.g. 44.

In operation of the preferred embodiment set forth above, when the engine of the motor vehicle is turned on, the pump 60 automatically begins operation. Assuming that the regulator valve 65 is in the neutral, or idle, position shown in FIG. 4, there is substantially no fluid pressure drag from the pump, as both the inlet and outlet from the pump are open to the atmosphere. No fluid pressure is transmitted to any of the inflatable means as the fluid feed port 63 is closed by valve member 86. If it is desired to inflate one of the inflatable chairs 10, the lid 22 over the recessed rigid retaining member container 12 is opened to the position shown in FIG. 1, the shut-off valve 127 is opened and the manual control knob 96 is rotated so as to move the housing dividing member 72 clockwise so that valve element 84 seals atmosphere outlet 93 and fluid feed port 63 is open to the outlet chamber 92. The pump 60 is thus delivering air under pressure to the inflatable article 10. When the housing dividing member 72 is rotated, the drum 102 is rotated against the bias of the leaf spring 107 acting against the lug 105; the rotation movement is limited by the lug 74, acting against the side of valve element 86; the pivot arm 120 passes over the outer inclined cam face of the projecting ear 111 and the forward portion of ear 111 is held against the pivot ear 120 preventing the return movement of the drum 102 in response to the bias of spring 107 back toward the neutral position.

The air enters through filter 82 into the inlet chamber 90, through the inlet port 62 to the pump 60, from the pump 60 through pump outlet pump 64 into the outlet chamber 92, through the feed fluid port 63 to the manifold 68, through valve 127, conduit 44 and into the space defined by inflatable article 10. When the pressure in the inflatable article, as transmitted through conduits 44 and 66, to the diaphragm 115 reaches the desired level, e.g. from about 3 to 30 psi gauge has been found useful for a chair, diaphragm 115 is moved outwardly against the bias of spring 116 causing pivotal movement of lever 120 which moves laterally away from the projecting ear 110, thereby releasing the drum 102 and enabling the drum 102 and the spindle 94, and thus the housing dividing member 72, to rotate to the neutral position, as shown in FIG. 5, under the influence of the leaf spring 107.

When the housing dividing member 72 is once again in the neutral position, the pump is at idle and no further pressure is admitted to the inflatable article 10. The shut-off valve 127 should be turned to its close position, thereby sealing the interior of the inflatable article 10. At this point, the other inflatable articles can be sequentially inflated, by repeating the operation of sequentially opening the other shut-off valves 128 and 129 and turning the regulator valve to the inflating position. Alternatively, assuming a pump of sufficient capacity is available, all of the inflatable articles 10 can be simultaneously inflated by simultaneously opening all of the shut-off valves 127, 128 and 129, when the regulating valve is in its inflating position. The shut-off valves 127, 128 and 129 enable the inflatable articles 10 to be independently inflated and deflated as desired, and further eliminates the requirement that the various valve members in the regulating valve be air-tight.

When it is desired to deflate the inflatable article 10, the shut-off valve 127 is again turned to the open position and the knob 96 is rotated so that the housing dividing member 72 is moved in a counterclockwise direction sealing off atmosphere inlet conduit 91 and opening the feed fluid port 63 to the inlet chamber 90, such that air is withdrawn from the inflatable article 10 through conduits 44 and 66 and port 63 into the valve 65, through the pump inlet port 62, through the pump, through the pump outlet port 64 and out atmosphere outlet port 93. When the air is evacuated from within the inflatable article, in the preferred embodiment, the flexible member 10 is drawn into the recessed rigid retaining member container 12, by the suction exerted by the pump. The flexible member 10 is drawn into the recessed member 12, in the same manner as a sock would be drawn in, from the inside out, ideally without any manual assistance; but, if desired, manually folding the flexible member 10 during the deflation, would be of assistance. When the flexible member 10 is completely within the recessed rigid member 12, and the pressure system drops to below a certain level, the helical spring bias member 116 pushes the diaphragm 115 outwardly, thereby moving the push rod 118 in a longitudinal direction, causing the pivoting of the level arm 120 and the movement out of engagement of the far end of the lever arm 120 from the projecting ear 110. This releases the drum 102, shaft 94 and housing dividing member 72 to rotate under the influence of the leaf spring 108, returning the housing dividing member 72 to the neutral, or idle, position shown in FIG. 4. The lid of container 12 can then be closed and once again a flat floor surface is presented for use as cargo space or other desired purposes.

The automatic cut-off means acts to prevent the excessive build-up, or excessive reduction, of pressure within the pneumatic system. However, if desired, the regulating valve can be returned to its neutral position manually by pulling out on the manual knob 96, thereby disengaging ear 110 from pivot rod 120 and again freeing the spindle 94 to rotate the valve element 72 into its neutral position under the influence of one or the other of leaf springs 107 and 108.

A dash pot, or other damping device, can be present in the conduit 44 between each of the shut-off valves 127, 128 and 129 and each of the inflatable articles 12.

If desired, in addition to the inflatable chairs illustrated in the attached drawings, inflatable devices also include shockabsorbing cushion means and spacer means attached in the floor, side walls or ceiling of the truck to protect delicate cargo that may be carried. The exact design of the seating system, whether a chair, sofa, etc., is not a part of this invention and any type of seating arrangement can be utilized. In addition to the illustrated chairs in the drawings herewith, wherein the occupant sits directly upon an inflated member, a chair having a sling arrangement can be used wherein a flexible material is suspended between inflatable portions, thereby removing the user out of contact from the impermeable surface of the inflatable means and in many cases, increasing the comfort of the user. See for example, the suspended seat shown in U.S. Pat. No. 2,437,602.

Similarly, the exact arrangement and design of the air pump is not a part of the invention and alternative types of regulating valves can be utilized within at least some aspects of the present inflatable article.

In attaching the inflatable seating system or other inflatable member in accordance with the present invention into a motor vehicle, a portion of the floor is removed, generally rectangular in shape, corresponding to the cross-section of the rigid retaining member 12. Portions of the floor adjacent the opening are drilled and bent downwardly to form flanges to which the recessed rigid retaining member 12 is secured by bolts 55. It has been found that the structural strength of the motor vehicle body, even in those circumstances where the wall or floor forms a structural portion of the vehicle, is not decreased but in fact increased by the introduction of the rigid retaining member. The retaining member 12 can be secured to the floor by other means, for example, welding, especially where both the floor and the container walls are made of metal.

As pointed out above, an inflatable seating system can be connected to a vertical or wall surface; the marginal portions are thus in a vertical side or a back surface of the flexible member and this vertical surface presses against the rigid surface surrounding the rigid member. The surface forming the bottom of the article extends below the rigid retaining member, preferably pressing against the floor for added support against the weight of an occupant.

We claim:

1. A pneumatic system designed and adapted for use in a powered vehicle, the system comprising (1) a fluid pump having a high pressure outlet and a low pressure inlet; (2) drive means for the fluid pump, designed and adapted to operatively connect the fluid pump to the vehicle power source; (3) a stabilized, firmly anchored inflatable article, the inflatable article comprising a flexible, substantially fluid-impermeable member, the flexible member being shaped to define a fluid space; marginal portions on the flexible member defining an opening therethrough; and a rigid retaining member in fluid-tight connection with the marginal portions, the rigid retaining member and the flexible member defining a fluid-tight space; (4) fluid feed conduit means in fluid flow connection with the fluid pump and with the fluid-tight space; (5) regulating valve means designed and adapted to be positioned in intermediate fluid flow relationship with the fluid pump and the inflatable article, so as to control the flow of fluid between the fluid-tight space, and the fluid pump through the fluid feed conduit means, the regulating valve means comprising (a) a valve housing divided into two mutually sealed off chamber, an inlet chamber being in fluid flow connection with the inlet to the pump, with the atmosphere and with the fluid feed conduit to the inflatable article, a fluid outlet chamber being in fluid flow connection with the outlet from the pump, the atmosphere and the fluid feed conduit to the inflatable article; (b) first valve means capable of closing off the atmosphere from the inlet chamber; (c) second valve means capable of closing off the inlet chamber from the fluid feed conduit; (d) third valve means capable of closing off the outlet chamber from the atmosphere; (e) fourth valve means capable of closing off the outlet chamber from the fluid feed conduit, and (f) integrating means for ordering the action of the first, second, third and fourth valve means to place the pneumatic system is desired sequential operating conditions, whereby in a neutral, or idle, condition, the second and fourth valve means are in the closed position and the first and second valve means are in the open position; in an inflating condition, the first and the fourth valve means are in open positions and the second and the third valve means are in closed positions, permitting the high pressure air from the outlet from the pump to pass to the inflatable article; and in a deflating condition the first and the fourth valve means are in closed positions and the second and the third valve means are in open positions, permitting the pump to draw air from the inflatable article to the low pressure inlet to the pump; the rigid retaining member being designed and adapted to be rigidly connected to a substantially rigid surface on a powered vehicle whereby, in the inflated condition, the flexible member extends outwardly and laterally from the rigid retaining member and portions of the flexible member press against the rigid surface thereby stabilizing the inflatable article with regard to the rigid surface.

2. The pneumatic system of claim 1, comprising, in addition, a shut-off valve in the fluid feed conduit, intermediate the regulating valve means and the inflatable article, operable independently of the regulating valve means.

3. The pneumatic system of claim 1, comprising in addition automatic shut-off means designed and adapted to automatically place the regulating valve means into the neutral, or idle, position when the pressure within the fluid feed conduit reaches pre-determined outside limits.

4. The pneumatic system of claim 1, wherein the fluid pump is a positive displacement pump.

5. A pneumatic system of claim 1, wherein the inflatable article is a seating system.

6. A pneumatic system designed and adapted for use in a powered vehicle, the system comprising (1) a fluid pump having a high pressure outlet and a low pressure inlet; (2) drive means for the fluid pump, designed and adapted to operatively connect the fluid pump to the vehicle power source; (3) a stabilized, firmly anchored inflatable article, the inflatable article comprising a flexible, substantially fluid impermeable member, the flexible member being shaped to define a fluid space; marginal portions on the flexible member defining an opening therethrough; and a rigid retaining member in fluid-tight connection with the marginal portions, the rigid retaining member and the flexible member defining a fluid-tight space; (4) fluid feed conduit means in fluid flow connection with the fluid pump and with the fluid-tight space; (5) regulating valve means designed and adapted to be positioned in intermediate fluid flow relationship with the fluid pump and the inflatable article, so as to control the flow of fluid between the fluid-tight space and the fluid pump through the fluid feed conduit means; the regulating valve means comprising: (a) a valve housing; (b) a housing-dividing element pivotally mounted within the regulator housing, and movable within a limited angle of rotation, the element dividing the housing into two mutually sealed chambers: an inlet chamber and an outlet chamber; (c) an air inlet port connecting the inlet chamber to the atmosphere; (d) an air outlet port connecting the outlet chamber to the atmosphere; (e) a pump inlet port connecting the inlet chamber to the inlet end of the pump; (f) a pump outlet port connecting the outlet chamber to the outlet end of the pump; and (g) a feed port connecting to the fluid feed conduit; (h) first, second and third valve means, each connected to the housing dividing element, the first, second and third valve means each being movable within the housing within the limited rotational movement of the dividing element, the first and second valve elements being connected to one end of the housing dividing element and so positioned to close the air inlet port and air outlet port respectively at an extreme rotational position of the dividing element, the feed port being so juxtaposed in the housing relative to the limited movement of the housing dividing means as to be in connection with the inlet and outlet chambers at each extreme rotational position of the dividing element, respectively, whereby in the idle position, the first and second atmosphere ports are open and the fluid feed port is closed by the third valve; in the inflation position the first atmosphere port is open, the second atmosphere port is closed by the second valve and the fluid feed port is in fluid flow connection with the outlet chamber; and in a third deflating position, the atmosphere inlet port is closed by the first valve, the atmosphere outlet port is open and the fluid feed port is in fluid flow connection with the inlet chamber; the rigid retaining member being designed and adapted to be rigidly connected to a substantially rigid surface on a powered vehicle whereby, in the inflated condition, the flexible member extends outwardly and laterally from the rigid retaining member and portions of the flexible member press against the rigid surface thereby stabilizing the inflatable article with regard to the rigid surface.

7. A powered vehicle comprising a rigid surface defining the interior space of the vehicle; a power source for the vehicle; a fluid pump; drive means operatively connecting the fluid pump to the power source; a rigid retaining member secured to the rigid surface; a flexible member, shaped to define a fluid space; the flexible member having marginal portions defining an opening therethrough, the marginal portins being in fluid tight connection with the rigid retaining member, the rigid retaining member and the flexible member defining a fluid-tight space; fluid feed conduit means in fluid flow connection with the fluid pump and the fluid-tight space; regulating valve means positioned in intermediate fluid flow relationship to the fluid pump and to the fluid-tight space, the regulating valve means being designed and adapted to maintain the following sequential fluid flow arrangements: (1) placing the fluid feed conduit means in fluid flow connection with the high pressure outlet from the pump and the low pressure inlet to the pump in fluid flow connection with the atmosphere, in a first inflating position; (2) placing the fluid feed conduit in fluid flow connection with the inlet to the pump, and the outlet from the pump in fluid flow connection to the atmosphere, in a second deflating position; and (3) closing off the fluid feed conduit from fluid flow connection with the fluid pump and placing both the inlet and the outlet to the pump in fluid flow connection to the atmosphere, in a third idle position.

8. The powered vehicle of claim 7, comprising in addition, a shut-off valve in intermediate fluid flow relationship to the regulating valve and the fluid inflatable article.

9. The powered vehicle of claim 7, wherein the inflatable article is a seating system.

10. The powered vehicle of claim 9, comprising a plurality of inflatable articles, a manifold in intermediate fluid flow relation between the regulator valve and the inflatable articles, each inflatable article being in independent fluid flow connection with the manifold, and a shut-off valve in intermediate fluid-flow relation between each inflatable article and the manifold.

* * * * *

UNITED STATES PATENT AND TRADEMARK OFFICE
CERTIFICATE OF CORRECTION

PATENT NO. : 4,040,655
DATED : August 9, 1977
INVENTOR(S) : Laurence James Garrick; Rachel Simon It is certified that error appears in the above-identified patent and that said Letters Patent are hereby corrected as shown below:

Column 12, line 20 (Claim 1, line 23) - correct "chamber" to --chambers--

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*